Figure 1:
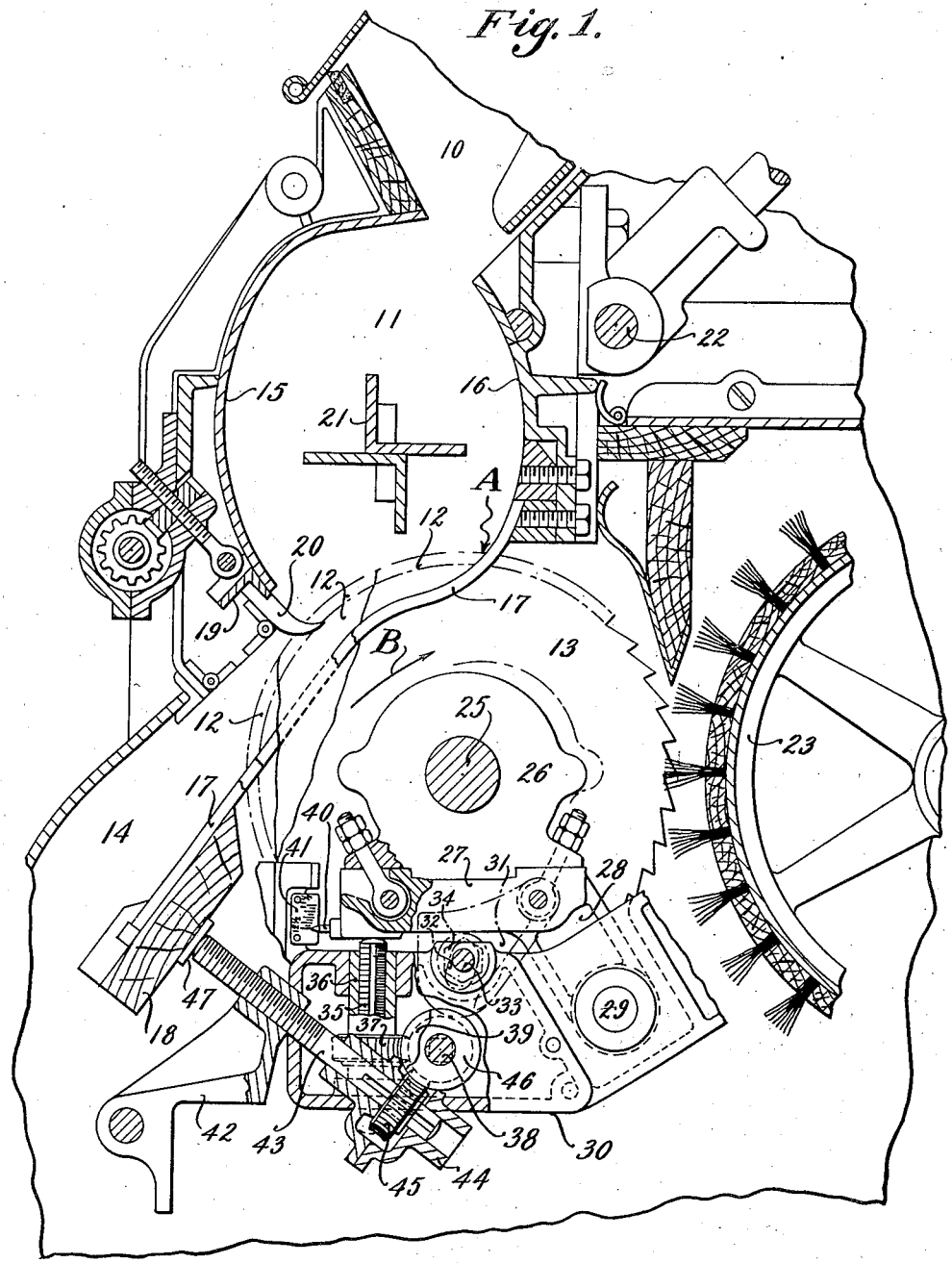

Jan. 22, 1935.  R. W. McLEAN  1,988,850
GIN
Filed June 17, 1931  2 Sheets-Sheet 1

Inventor,
Robert W. McLean,
by Roberts, Cushman & Woodberry.
Attys.

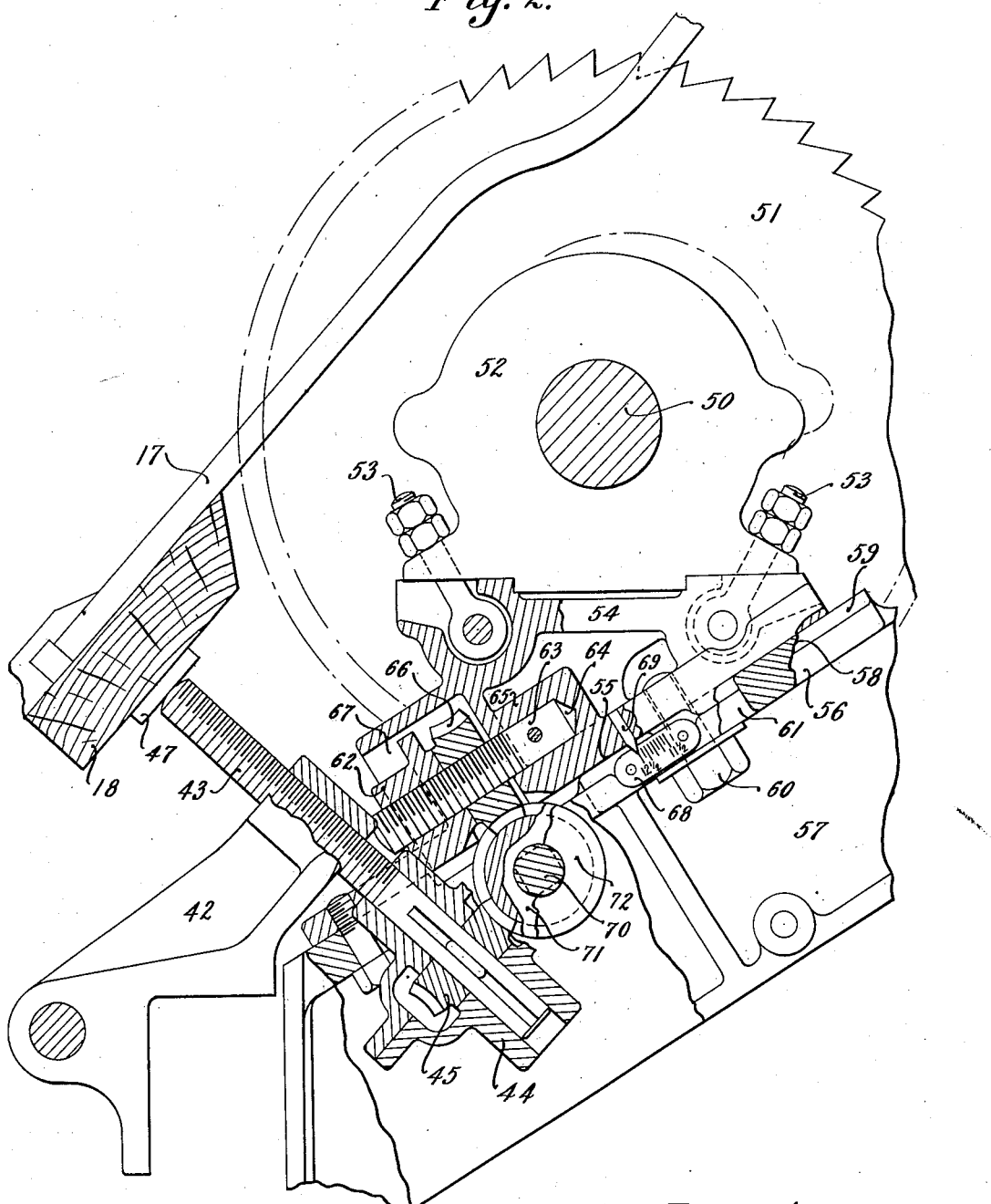

Patented Jan. 22, 1935

1,988,850

UNITED STATES PATENT OFFICE 1,988,850

GIN

Robert W. McLean, Bridgewater, Mass., assignor to Carver Cotton Gin Company, East Bridgewater, Mass., a corporation of Massachusetts Application June 17, 1931, Serial No. 544,985

11 Claims. (Cl. 19—55)

This invention relates to an improvement in ginning apparatus and has for its primary object to provide means for mounting the saw cylinder therein so that it can be readily adjusted relative to the doffing means and to the ginning chamber.

In the ginning apparatus disclosed in my Patent No. 1,599,024 dated September 7, 1926 the saw cylinder, after its diameter has been decreased by sharpening and use below a certain minimum, a plurality of parts must be adjusted relatively to the saws and to each other in order to maintain the proper relations at the ginning and doffing points, involving considerable expenditure of labor and loss of time. When, however, the saw cylinder is mounted in accordance with this invention the cylinder can be adjusted easily to maintain the blades in the positions at which they will operate most efficiently by the manipulation of a single element conveniently located for the purpose. The mounting of the saw cylinder with this object in view is generally similar to the mounting disclosed in my Patent No. 1,516,052 dated November 18, 1924, being however modified in certain respects in view of the differences in function.

In the accompanying drawings this invention is illustrated with respect to the mounting of a saw cylinder in the linter gin shown in my prior Patent No. 1,599,024 above mentioned, Fig. 1 setting forth one embodiment of this invention; and Fig. 2 setting forth another embodiment thereof.

The portion of the linter gin shown in Fig. 1 of the drawings includes a hopper 10 from which the seed is supplied to a ginning chamber 11 in which it is treated by the saw blades 12 of a saw cylinder 13, the lint being removed from the chamber by the saw blades and the delinted seed passing into the seed guide 14 by which it is conducted out of the gin.

The ginning chamber 11 is of the usual well known type, being closed at the ends and having a front concave breast wall 15 and a rear concave breast wall 16. The wall 16 includes a gratefall consisting of a plurality of spaced parallel bars 17 which extend below the chamber 11 to form the rear wall of the seed guide 14 and are connected at their lower ends by a crossbar 18. The saw blades of the cylinder extend through the spaces between the bars 17 as indicated in dotted lines. At the lower end of the front wall 15 is adjustably mounted a rake 19 having a plurality of teeth 20 located in the vertical planes of the bars 17.

The breast structure also includes a float roll 21 which is mounted in the chamber or roll box 11 and is rotated by suitable means (not here shown) to form the seed being treated into a roll and press it against the upper ends of the bars 17 at approximately the point indicated by the reference character A at which the saw blades tear the fibres from the seeds. The breast walls, gratefall, float roll, and rake form a unit mounted upon a shaft 22 and having a pivotal movement relative thereto as is described in detail in my prior Patent No. 1,599,024. The fibres torn from the seed are carried by the saw blades to doffing means here shown as a brush cylinder 23 by which the fibres are removed from the saw teeth and disposed of in any desired manner.

The saw cylinder 13 comprises a plurality of the blades 12 mounted upon a shaft 25 rotated by any suitable means in the direction designated by the arrow B. The shaft 25 is supported at each end and while the support at one end only is here shown and will be described in detail, it will be understood that the support at the other end corresponds thereto in every respect. The shaft rests in a saddle 26 mounted upon a bolster 27 and removably secured thereto. The bolster 27 terminates at one end in an arm 28 pivoted upon a shaft 29 carried by a platform 30. An ear 31 projecting from the bolster is provided with a slot 32 through which passes a bolt 33 carried by the platform 30 and having a nut 34 thereon by which the ear is clamped to the platform after the bolster has been fixed in the desired position by means about to be described. The free end of the bolster rests upon a screw bolt 35 which limits the movement of the bolster in one direction and is threaded into a sleeve 36 keyed in a collar here shown as integral with the platform. A gear 37 surrounds the bolt 35 and while keyed for rotation with the bolt does not travel longitudinally therewith. Extending transversely of the platform is a shaft 38 having a gear 39 thereon which meshes with the gear 37. The shaft 38 is parallel to the shaft 25 and projects at one end beyond the casing of the linter gin having at that end a crank, wheel, or the like (not shown) by which the shaft 38 may be rotated for a purpose to be described later. Projecting from the free end of the bolster 27 is a needle 40 which extends over a scale 41 carried by the platform. It is common practice in gins of this type to insert transparent panels in the outer casing and the scale is so located that the position of the needle thereon can be readily observed.

Threaded in a supporting bracket 42 is a screw bolt 43 mounted to reciprocate in a suitably supported housing 44. Keyed to the bolt 43 for rotation therewith is a gear 45 which meshes with a gear 46 fixed upon the shaft 38. One end of the bolt 43 bears against a wear plate 47 on the crossbar 18. Obviously the rotation of the bolt 43 in one direction by the shaft 38 will cause the bolt to retreat from the crossbar 18 and its rotation in the other direction will cause it to exert pressure against such bar. Since the gears 39 and 46 are mounted upon the same shaft the bolts 35 and 43 will be rotated simultaneously.

The linter gin, as shown in Fig. 1, is ready to operate and when the float roll 21, saw cylinder 13 and brush cylinder 23 are rotated the seed roll will be delinted at the point A. The saw blades are here shown as having a diameter of twelve and a half inches and the needle 40 is at that indicated point on the scale. As the operation of the gin continues, repeated sharpening gradually reduces the diameter of the saw blades, resulting in lowering the point at which the seed roll is delinted and reducing the amount of contact of the saw teeth with the brushes of the brushing cylinder so that the seed is not properly delinted and the lint not properly removed from the saw teeth. By loosening the nuts 34 on the bolts 33 and then rotating the shaft 38 anti-clockwise, the bolts 35 at each side of the machine are simultaneously advanced, elevating the bolsters 27 and thereby lifting the saw cylinder upwardly and rearwardly until the periphery returns to the original position A in the ginning chamber and the saw teeth are fully engaged by the brushes of the brushing cylinder. The bolts 33 are then tightened and the cylinder secured.

It will be noted that, since the diameter of the saw blades has decreased, the relation of the blades to the gratefall has been altered and in order to restore this relation the gratefall must be lowered. The rotation of the shaft 38 to advance the bolts 35 has at the same time, through the gears 45, 46 retracted the bolts 43 at opposite sides of the machine so that they tend to retreat from the crossbar 18. The breast unit above mentioned being released from its retaining means, if such be provided, thus swings about the shaft 22, (the wear plate 47 following the ends of the screw bolts 43) and then may if necessary be secured in such adjusted position. The gear ratios are so designed that this movement of the breast unit lowers the gratefall and float roll exactly the distance necessary to restore the proper position of the gratefall and float roll relative to the saw blades. This adjustment may be repeated from time to time as required until the saw blades have been worn to the minimum diameter, indicated on the scale as eleven and one-half inches. The saw cylinder is then replaced by one having blades of the proper diameter and the parts restored to the original condition shown in the drawings.

Fig. 2 illustrates on a larger scale a saw cylinder mounting differing from that previously described in the manner in which the saw cylinder shaft is shifted upwardly and rearwardly. In this embodiment the shaft 50 of the saw cylinder 51 is carried in a saddle 52 removably secured by bolts 53 to a bolster 54. The bolster has an inclined bottom surface 55 which rests upon the upper surface 56 of a stationary platform 57. In order to guide the movement of the bolster over the platform 57, the surface 55 of the bolster is provided with a longitudinal groove 58 which receives a tongue 59 on the surface 56 of the platform. The bolster is releasably secured in place upon the platform by any suitable means, as for example, by a screw bolt 60 carried by the bolster 54 and a slot 61 in the platform through which the shank of the bolt 60 passes. Fixed upon the surface 56 of the platform 57 is a bracket 62 having an opening therethrough which receives and guides a threaded bolt 63 one end of which bolt enters and is fixed in a pocket 64 formed in a boss 65 upon the bolster 54. Threaded upon the bolt 63 between the bracket 62 and the bolster 54 is a gear 66 the rotation of which causes the bolt 63 to travel longitudinally independent of the gear 66. The bracket and gear are preferably shielded in a compartment 67. Secured to the side of the surface 56 is a scale 68 over which extends a needle 69 carried by the bolster. A shaft 70 rotatably supported in the platform 57 carries a gear 71 which meshes with the gear 66. The shaft 70 like the shaft 38 of the first embodiment extends outside the casing of the linter gin and is provided with any suitable form of handle (not shown) whereby it may be rotated. The shaft 70 in addition to advancing the bolt 63 and thereby adjusting the bolster 54 also, through a gear 72, concomitantly adjusts the gratefall and float roll to maintain their proper relation to the saw blades as set forth in the description of the operation of the embodiment shown in Fig. 1. The means shown for carrying out such gratefall adjustment are the same as those described above and accordingly will be designated on the drawings by the same reference characters and will not be described in detail. The rotation of the shaft 70 in this embodiment will obviously raise the saw cylinder 13 upwardly and rearwardly and simultaneously retract the bolt 43 so that the gratefall and float roll can be shifted as previously described.

While certain embodiments of this invention have been shown and described I am not limited thereto since other embodiments can be made without departing from the spirit and scope of this invention as set forth in the following claims.

I claim:

1. In a linter gin the combination with a gratefall, saw cylinder and doffing means, of a support for the saw cylinder including saddles for the cylinder shaft, movable bolsters on which the respective saddles are supported, an axially movable screw-threaded member associated with each bolster, means, including a rotary, bolster-adjusting gear coaxial with each screw-threaded member, for moving the screw-threaded members axially, a rotary shaft having thereon spaced driving gears meshing with the aforesaid bolster-adjusting gears, respectively, means for turning the shaft thereby concomitantly to advance both bolsters and thereby move the cylinder bodily toward the doffing means, said gratefall being pivotally mounted and including gratebars and a transversely extending crossbar, an axially movable screw-bolt engaging an element of the gratefall to limit pivotal movement of the latter in one direction, and means operative, by rotation of the aforesaid shaft, to retract said screw-bolt concomitantly with the advance of the bolster and thereby lower the gratefall.

2. In a linter gin the combination with a gratefall, saw cylinder, a float roll disposed in cooperative relation to the saw cylinder, and doffing means, of a support for the saw cylinder including saddles for the cylinder shaft, bolsters on which said saddles are supported, a platform on which each bolster is mounted and relatively to which the bolsters are movable, respectively, means carried by the respective platforms for moving the bolsters, said bolster-moving means comprising an axially movable screw-threaded member associated with each bolster, means, including a rotary worm gear coaxial with each screw-threaded member, for moving the screw-threaded members axially, a rotary shaft having thereon spaced worms meshing with the aforesaid worm gears, respectively, means for turning the shaft thereby concomitantly to advance both bolsters and thereby move the cylinder bodily upwardly and rearwardly, said gratefall being pivotally mounted and including gratebars secured at their lower ends to a transversely extending crossbar, means carried by the respective platforms for moving the bolsters, an axially movable screw-bolt engaging the crossbar of the gratefall to limit downward movement of the latter, and a worm gear coaxial with said screw-bolt and operative to turn the latter, said worm gear meshing with a worm on the aforesaid shaft, whereby, when the shaft is turned to advance the bolsters, the gratefall is simultaneously lowered.

3. In a linter gin the combination with a gratefall, saw cylinder, a float roll disposed in cooperative relation to the saw cylinder, and doffing means, of a support for the saw cylinder including saddles for the cylinder shaft, bolsters on which said saddles are supported, an axially movable screw-threaded member associated with each bolster, means, including a rotary, bolster-adjusting worm gear coaxial with each screw-threaded member, for moving the screw-threaded members axially, a rotary shaft having thereon spaced driving worms meshing with the aforesaid bolster-adjusting worm gears, respectively, means for turning the shaft thereby concomitantly to advance both bolsters so as to move the cylinder bodily toward the doffing means, said gratefall being pivotally mounted and including gratebars and a transversely extending crossbar, a pair of axially movable screw-bolts, each arranged to engage the crossbar of the gratefall adjacent to opposite ends of the latter, respectively, to limit downward movement of the gratefall, a worm gear coaxial with each of said screw-bolts and operative respectively to move said bolts axially, said worm gears meshing respectively with the worms on the aforesaid shaft, the several worms and gears being so designed that when the shaft is turned to advance the bolsters and thereby raise the cylinder the screw-bolts are concomitantly retracted to lower the gratefall.

4. In a linter gin the combination with a gratefall, saw cylinder, a float roll disposed in cooperative relation to the saw cylinder and doffing means, of a support for the saw cylinder including saddles for the cylinder shaft, bolsters on which said saddles are supported, a platform on which said bolsters are mounted and relative to which the bolsters are movable, screw bolts threaded in said platform and longitudinally movable therein, which bolts contact with the bolsters and limit their movement in one direction, a gear carried by each bolt and keyed thereto for rotation with the bolt while permitting longitudinal movement thereof independent of the gear, a rotatable shaft carried by said platform, gears on said shaft meshing with the gears on the bolts whereby the rotation of the shaft in one direction causes the rotation and advance of the bolts to move the bolsters and thereby move the cylinder relative to the doffing means, and mechanism operated by said rotatable shaft for moving the gratefall and float roll relative to the cylinder, whereby the relative positions of the gratefall, cylinder, float roll and doffing means may be adjusted as desired.

5. In a linter gin the combination with a gratefall, saw cylinder and doffing means, of a support for the saw cylinder including saddles for the cylinder shaft, bolsters on which said saddles are supported, a platform to which one end of each bolster is pivotally secured, longitudinally movable elements carried by said platform which engage the other ends of the bolsters and limit their pivotal movement in one direction, and means for advancing said elements to swing said bolsters about their pivots and thereby move the cylinder bodily relatively to the doffing means.

6. In a linter gin the combination with a gratefall, saw cylinder and doffing means, of a support for the saw cylinder including saddles for the cylinder shaft, bolsters on which said saddles are supported, a platform to which one end of each bolster is pivotally secured, longitudinally movable elements carried by said platform which engage the other ends of the bolsters and limit their pivotal movement in one direction and means for advancing said elements to swing said bolsters about their pivots and thereby move the cylinder bodily relatively to the doffing means, said gratefall being pivotally mounted and including spaced parallel bars connected at one end by a crossbar, and longitudinally movable means engaging said crossbar for limiting the pivotal movement of the gratefall in one direction, said limiting means being retracted by the element advancing means to permit movement of the gratefall in such direction.

7. In a linter gin the combination with a gratefall, saw cylinder and doffing means, of a support for the saw cylinder including saddles for the cylinder shaft, bolsters on which said saddles are supported, a platform to which one end of each bolster is pivotally secured, screw bolts carried by said platform which engage the other ends of the bolsters and limit their pivotal movement in one direction, and means for rotating the bolts to cause them to advance, swing the bolsters about their pivots, and thereby move the cylinder toward the doffing means.

8. In a linter gin the combination with a gratefall, saw cylinder and doffing means, of a support for the saw cylinder including saddles for the cylinder shaft, bolsters on which said saddles are supported, a platform to which one end of each bolster is pivotally secured, screw bolts carried by said platform which engage the other ends of the bolsters and limit their pivotal movement in one direction, and means for rotating the bolts to cause them to advance, swing the bolsters about their pivots and thereby move the cylinder bodily relatively to the doffing means, said gratefall being pivotally mounted and including spaced parallel bars connected at one end by a crossbar, and screw bolts carried by said platform which engage the crossbar and limit the pivotal movement of the gratefall in one direction, said limiting screw bolts being rotated by said bolt rotating means to retract them and permit movement of the gratefall in such direction.

9. In a linter gin the combination with a gratefall, saw cylinder and doffing means, of a support for the saw cylinder including saddles for the cylinder shaft, bolsters on which said saddles are supported, a platform to which one end of each bolster is pivotally secured, screw bolts threaded in said platform and longitudinally movable therein, which bolts contact with the bolsters and limit their pivotal movement in one direction, gears carried by each bolt and keyed thereto for rotation with the bolt while permitting longitudinal movement thereof independent of the gear, a rotatable shaft carried by said platform, and gears on said shaft meshing with the gears on the bolts whereby the rotation of the shaft in one direction causes the rotation and advance of the bolts to swing the bolsters and thereby move the cylinder toward the doffing means.

10. In a linter gin the combination with a gratefall, saw cylinder and doffing means, of a support for the saw cylinder including saddles for the cylinder shaft, bolsters on which said saddles are supported, a platform to which one end of each bolster is pivotally secured, screw bolts threaded in said platform and longitudinally movable therein, which bolts contact with the bolsters and limit their pivotal movement in one direction, gears carried by each bolt and keyed thereto for rotation with the bolt while permitting longitudinal movement thereof independent of the gear, a rotatable shaft carried by said platform, and gears on said shaft meshing with the gears on the bolts whereby the rotation of the shaft in one direction causes the rotation and advance of the bolts to swing the bolsters and thereby move the cylinder upwardly and rearwardly, said gratefall being pivotally mounted and including spaced parallel bars connected at one end by a crossbar, screw bolts threaded in said platform and longitudinally movable therein, which bolts contact with said crossbar and limit the pivotal movement of the gratefall in one direction, gears carried by each bolt and keyed thereto for rotation with the bolt while permitting longitudinal movement thereof independent of the gear, and gears on said shaft which mesh with the gears on said bolts whereby the rotation of the shaft in one direction causes the rotation and retraction of the bolts to permit further pivotal movement of the gratefall in such direction.

11. In a linter gin the combination with a gratefall, saw cylinder and doffing means, of a support for the saw cylinder including saddles for the cylinder shaft, bolsters on which said saddles are supported, platforms having inclined surfaces upon which surfaces the respective bolsters are supported, a screw-threaded member fixedly secured to each bolster, a pair of worm wheels, each having a threaded bore meshing with one of said screw-threaded members, respectively, an abutment carried by each platform to limit axial movement of the respective worm wheels in a downward direction, a shaft having a pair of spaced worms thereon meshing with the worm wheels respectively, means for turning the shaft thereby simultaneously to rotate the worm wheels and advance the bolsters along said inclined surfaces so as bodily to move the saw cylinder upwardly and rearwardly, said gratefall being pivotally mounted and including spaced parallel gratebars, a screw-threaded bolt constituting an abutment engageable with an element of the gratefall to limit downward movement of the latter, and means for rotating said bolt as the bolster is advanced, said bolt rotating means comprising a part which is turned by rotation of the aforesaid shaft.

ROBERT W. McLEAN.